Patented Dec. 19, 1950

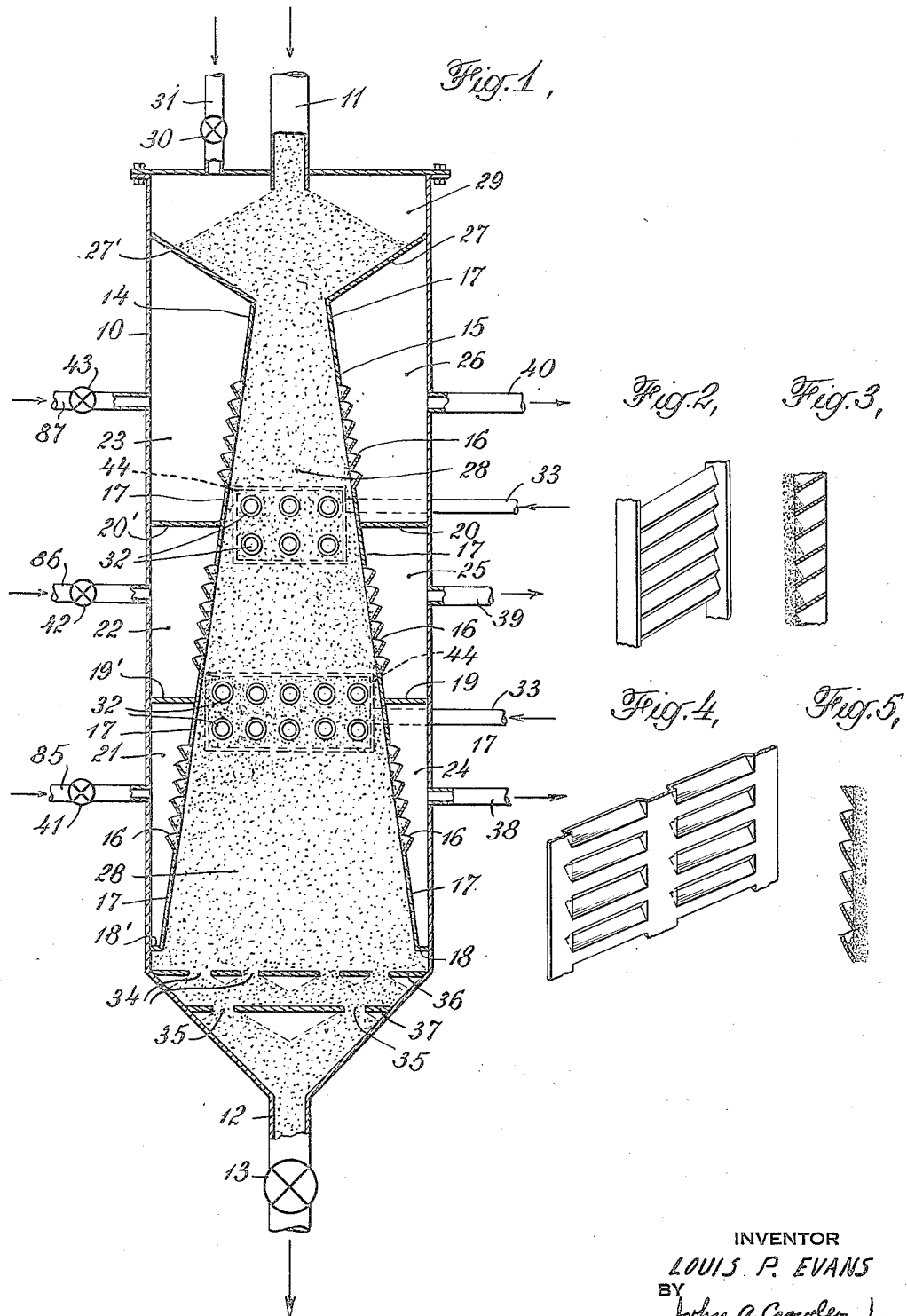

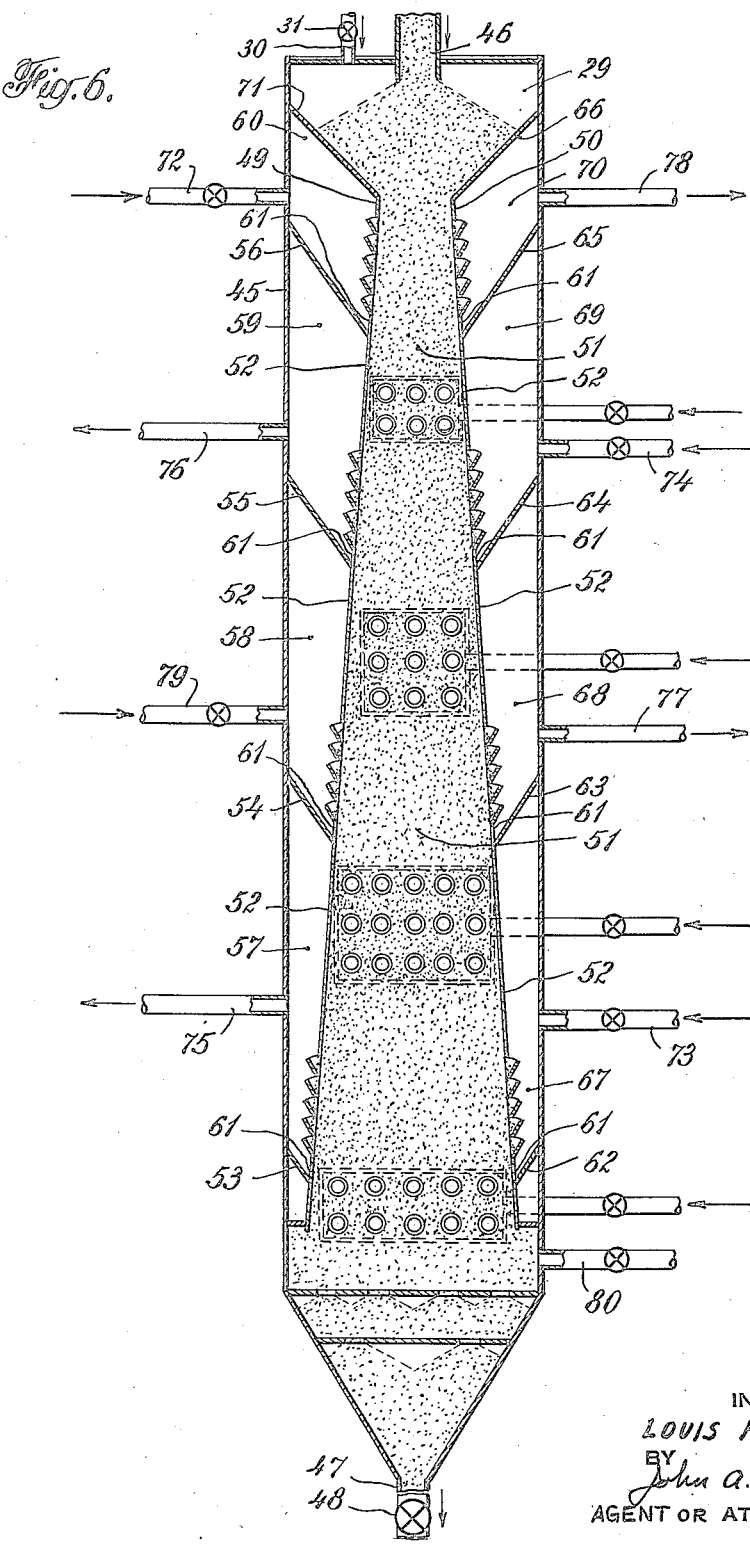

2,534,859

UNITED STATES PATENT OFFICE 2,534,859

METHOD AND APPARATUS FOR HYDROCARBON CONVERSION

Louis P. Evans, Woodbury, N. J., assignor to Socony-Vacuum Oil Company, Incorporated, a corporation of New York Application April 18, 1946, Serial No. 662,936

9 Claims. (Cl. 196—52)

This application is a continuation-in-part of my application Serial Number 464,547 filed in the United States Patent Office, November 4, 1942, now Patent Number 2,417,393 issued March 11, 1947.

This invention has to do with method and apparatus means for effecting intimate contact between gasiform reactants, such as, for example hydrocarbon gases and vapors, and particle-form solid material. It is well known that hydrocarbon vapors may be converted; for example, the vapors of gas oil at appropriate temperatures may be converted to gasoline by passage of those vapors in contact with an appropriate particle-form contact mass material. Such processes are widely known and are exemplified, for instance, in the patents of Eugene Houdry and associates. For example, gas oil vapors at temperatures around 850° F. may be converted to the extent of about 40% or so of gasoline of high anti-knocking capability by passage through a clay like catalyst in pellet form resulting in the deposit upon the clay of contaminating carbonaceous material which is later burned off by a combustion regeneration. Similar processes are utilized to accomplish other conversion purposes such a dehydrogenation, alkylation, isomerization, reforming and other processes of hydrocarbon conversion and also for the effecting of chemical reactions of other kinds such as, for example, the oxidation of naphthalene to phthalic anhydrides.

More recently processes of this type have been developed in which the particle-form solid catalytic material is flowed as a moving bed or column continuously through a zone wherein a reaction is continuously practiced, from thence to a somewhat similar zone in which a regeneration is continuously practiced, from which it returned to the reaction zone. The contact mass materials utilized in these processes partake generally of the nature of clays, that is, they are associations of alumina and silica in various proportions, from various sources, both natural and synthetic, and may or may not have other materials present to exert some effect in the desired reaction. In general, as examples of such materials there may be cited fuller's earth and other natural clays, acid refined natural clays, synthetic clays, coprecipitated gels, and other synthetic materials and any of these may be either catalytic in itself to the desired reaction or may act as a support or carrier for some other material which is catalytic to the desired reaction. In general these materials are utilized in the form of granules obtained by crushing larger masses or as pills, pellets, spheres, or rods obtained by pelleting, tableting, extrusion and similar processes.

The present invention has for its object the provision of useful forms of apparatus for effectively securing contact between gasiform reactants and a moving contact mass composed of particle-form solids.

Its major object is the provision of simple, relatively easily constructed, and accurately working apparatus for such use.

Another object is the provision of a practical multi-stage method and apparatus for gaseous reactant conversion in the presence of a particle-form contact material wherein different reactant flow conditions are provided in different stages.

Another object is the provision of a multi-stage reactor wherein the several stages may be substantially isolated, while maintaining substantial continuity of columnar catalyst flow through the several stages.

Another object is the provision of a multi-stage catalyst regenerator and method of regeneration wherein the catalyst temperature and rate of reaction in the successive stages may be individually controlled.

A specific object is the provision of an improved multi-stage method and apparatus for continuous catalytic conversion of hydrocarbons.

These and other objects will become apparent from the following discussion of the drawings wherein Figure 1 is an elevational view, partially in section of one form of the apparatus of this invention. Figures 2–5, inclusive, show details of partition construction which may be employed in the apparatus constructions shown in Figure 1. Figure 6 is an elevational view, partially in section, showing a modified form of the invention. All of these drawings are highly diagrammatic in form.

Turning now to Figure 1, there is shown a vertical vessel 10 having an inlet 11 for particle-form contact material at its upper end and a solid outlet 12 bearing flow control valve 13 at its lower end. Extending across said vessel in planes perpendicular to that of the drawing are two spaced apart partitions 14 and 15 which extend downwardly through said vessel at opposite angles with the vertical axis of said vessel so as to define therebetween a passage 28 for solid material flow through said vessel, which solid passage gradually increases in width from its upper to its lower end. These partitions may be supported at opposite sides from the vessel shell or by other means which will be apparent to those skilled in the art. Openings 16 are provided in each partition along vertically spaced apart sections thereof so as to provide alternate sections containing openings 16 and imperforate sections 17 along the vertical lengths of both partitions at corresponding vertical levels. The construction of the openings in the partitions 14 and 15 will be further discussed hereinafter but may be said in general to be so constructed as to permit free flow of gas therethrough while preventing gravity flow of the solid particles used therethrough. Horizontal partitions 18, 19, and 20 and 18', 19' and 20' extend between the shell of the vessel 10 and each partition 15 and 14, respectively, at the levels of the imperforate sections of said partitions so as to define between the vessel shell and partition 14, superimposed gas inlet spaces 21, 22 and 23 and between the shell and partition 15, superimposed gas outlet spaces 24, 25 and 26. Downwardly sloping partitions 27 and 27' in the upper section of vessel 10 to direct solid flow into the passage 28 between partitions 14 and 15 and to exclude solid flow from gas spaces 23 and 26. The partitions 27 and 27' also serve to provide in the upper end of vessel 10 a seal chamber 29 to which seal gas may be admitted through conduit 30 bearing valve 31. Heat transfer tubes 32 are positioned horizontally across the solid passage 28 at levels corresponding to the imperforate sections of the partitions 14 and 15. Heat exchange fluid may be admitted to said tubes through inlet conduits 33 and header boxes 44 on the back side of the vessel and withdrawn through similar header boxes and outlet conduits (not shown) on the front side of the vessel. It will be understood that other arrangements of heat transfer tubes and means for passing fluids therethrough may be provided. Also the heat transfer tubes may be provided either at every level corresponding to an imperforate section of the partitions 14 or 15 or only at some of such levels depending upon the particular operation involved. For some operations the heat transfer tubes may be omitted entirely. The arrangement shown in Figure 1 is particularly well adapted for apparatus used to conduct strongly endothermic or exothermic reactions such as catalyst regeneration. The arrangement shown provides a series of independent regeneration stages having independent gas inlet and outlet means and having therebetween a substantial column of catalyst which acts as a seal to prevent substantial interflow of gas between stages.

To better understand the apparatus and its operation for a typical application, the regeneration of catalyst from a hydrocarbon conversion process, may be considered. Spent catalyst from the hydrocarbon conversion reactor bearing a deposit of carbonaceous contaminant and existing at a contaminant combustion supporting temperature, for example 800° F., enters vessel 10 continuously through conduit 11 and passes from the seal or surge zone 29 into the upper end of the solid flow passage 28. When the catalyst reaches the level of the first section of openings, i. e., the uppermost burning zone or stage it is contacted with combustion supporting gas such as air which acts to burn the carbonaceous contaminant. The catalyst temperature gradually rises due to the heat liberated by contaminant combustion and must then be cooled to prevent its rise to a heat damaging level. The cooling is effected in the substantial absence of air flow in those sections of passage 28 opposite the imperforate sections of partitions 14 and 15 by means of a suitable cooling fluid circulated through heat transfer tubes 32. Thus, the catalyst flows as a substantially compact column downwardly through alternate burning and cooling stages until substantially all of the carbonaceous contaminant has been removed. The temperature of the catalyst may rise to about 1000–1100° F., for example, in any given burning stage and then fall off to about 850° F. to 950° F., for example, in any given cooling stage. The regenerated catalyst passes through orifices 34 and 35 in partitions 36 and 37, respectively, in the bottom of vessel 10 and then through outlet 12 at a rate controlled by valve 13. The orifices 34 and 35 in partitions 36 and 37 are so arranged as to provide for substantially uniform withdrawal of catalyst from all portions of the cross-sectional area of the lower end of passage 28 so that the downward rate of solid flow in all portions of passage 28 at any given level is substantially uniform. Air is introduced to the several burning stages through conduits 85, 86 and 87 feeding gas inlet spaces 21, 22 and 23, respectively. The air passes through the openings 16 in partition 14 at each stage and flows horizontally across the column of catalyst in passage 28. The spent regeneration gas passes through openings 16 in partition 15 into gas outlet spaces 24, 25 and 26 from which it is withdrawn through outlet conduits 38, 39 and 40, respectively. Valves 41, 42 and 43 are provided on inlet conduits 85, 86 and 87, respectively, to permit independent control of the rate of air flow through each burning stage. It will be noted that the length of path for gas flow through the catalyst increases for each successive burning stage. This feature permits maximum utilizing of the vessel volume allotted to the burning reaction and maximum utilization of the combustion supporting gas. This is due to the fact that possible rate of contaminant combustion decreases gradually as its composition and amount on the catalyst decrease during the progress of the regeneration. In other words, for a constant linear gas velocity through the catalyst, the length of path required for utilization of the available oxygen in the regeneration gas gradually increases as the regeneration progresses. By provision of stages of progressively increasing width, the air rate in each stage may be maintained near the maximum allowable from pressure drop considerations, i. e., at capacity, and still the oxygen in regeneration gas is fully utilized to the desired extent in each stage. At the same time the above described construction permits utilization of a very large area for gas flow permitting high rates of gas flow by providing for transverse flow of gas through the solid. Moreover, all of this is accomplished without the use of throttle valves or systems of feed and discharge chambers between stages.

The apparatus may also be used as a hydrocarbon convertor, in which case, the heat transfer tubes between stages, if used at all may be used to supply heat for the reaction. The apparatus is very well adapted for multi-stage hydrocarbon conversion due to the fact that the catalyst gradually becomes less active due to contaminant deposition as it passes downwardly through the reactor. As a result, in order to obtain uniform yields of gaseous reaction products from each stage, the length of reactant path through the catalyst must be increased for each successive stage.

The construction of the openings in partitions 14 and 15 may take several forms. For example, the openings may be of Venetian blind construction such as is shown in Figures 2 and 3 or of louvered construction as shown in Figures 4 and 5. Figure 3 is a sectional view of the Venetian blind construction shown in Figure 2 and Figure 5 is a sectional view of the louvered construction shown in Figure 4. In general, the openings in the partitions should be of greater size than the diameter of the catalyst particles employed. On the other hand the louvered or Venetian blind type openings should be so arranged as shown to prevent the gravity flow of catalyst therethrough.

A somewhat modified apparatus construction is shown in Figure 6 wherein is shown a vessel 45 having a solid inlet 46 and outlet 47 bearing valve 48. Partitions 49 and 50 are provided within the vessel to define a solid flow passage 51. These partitions are somewhat similar to the partitions 14 and 15 in the vessel 10 of Figure 1. It will be noted that the length of each nonforaminate section 52 of partitions 49 and 50 is substantially greater than the width of the solid flow passage at the lower end of the gas flow stage just above and at the upper end of the gas flow stage just below. As a result, successive non-foraminate sections in each partition are progressively greater in length in the downward direction. Partitions 53, 54, 55 and 56 are provided to define gas spaces 57, 58, 59 and 60 and partition 71 defines the top of the uppermost gas space. It will be noted that these partitions instead of being positioned horizontally as the similar partitions in Figure 1, are positioned at a slope, and at the lower ends of said partitions openings 61 are provided in the partition 49. The construction permits the return to the solid passage 51 of any solid particles which may be blown through the openings in partition 49 into the gas spaces. Sloping partitions 62, 63, 64, 65 and 66 are similarly arranged to provide superimposed gas spaces 67, 68, 69 and 70 on the opposite side of the vessel. Gas inlet conduits 71 and 72 are connected into the gas spaces 58 and 60, respectively, on that side of the vessel adjacent partition 49 and outlet conduits 73 and 74 into gas spaces 67 and 69, respectively, on the opposite side of the vessel. Gas outlet conduits 75 and 76 are connected into the alternate gas spaces 57 and 59, respectively, on one side of the vessel and conduits 77 and 78 onto alternate spaces 68 and 70, respectively, on the opposite side of the vessel. Thus, the transverse gas flow in successive reaction stages is opposite in direction. This feature permits an improved uniformity of solid contact with reactant in that fresh reactant in successive stages is first injected into opposite sides of the column of the column of catalyst flowing through passage 51. It will be apparent that either the feature of returning solid from each gas space to the solid passage or the feature of opposite gas flow in successive stages may be used in the apparatus shown in Figure 1, independently of the other.

By proper manifolding of the inlets and outlets for the several stages, series flow of reactant through all the stages may be provided, if desired. It will be understood that the number of reaction stages provided depends upon the particular reaction involved. For some catalyst regeneration operations 10–15 burning stages with cooling stages therebetween may be provided.

When the vessel is used for hydrocarbon conversion a seal gas such as steam or flue gas may be introduced into the seal chamber 29 through conduit 30 at a rate sufficient to create a slightly higher seal gas pressure in the seal chamber than the pressure of the reactant in the uppermost reaction stage. An inert purge gas may be introduced through inlet 80 and distributed into the solid column by means (not shown) to purge reactant gas from the outflowing catalyst.

It will be understood that the detail of construction and of operation given hereinabove is exemplary in nature and is not intended to limit the scope of this invention except as it may be limited in the following claims.

I claim:

1. A method for conducting reactions involving gaseous materials in the presence of a particle form solid contact material which comprises: maintaining a substantially compact confined, vertical column of particle form contact material, effecting a progressive increase in width in one horizontal direction from the upper to the lower end of said column, supplying particle form contact material to the upper end of said column and withdrawing particle form contact material from the lower end thereof, passing gaseous reactant transversely across said column in the direction of its varying width independently at a plurality of vertically spaced apart sections of substantial vertical length, maintaining the gas flow opposite in direction in successive sections, and substantially excluding gaseous flow in the portions of said column between said sections.

2. A method for conducting reactions involving gaseous materials in the presence of a particle form solid contact material which comprises: flowing a particle-form solid contact material downwardly through a confined zone as a substantially compact column, controlling the flow of said column to effect a progressive increase in its width in one horizontal direction from the upper to the lower end thereof, supplying particle form contact material to the upper end of said column and withdrawing particle form contact material from the lower end thereof, passing gaseous reactant transversely across said column in the direction of its varying width independently at a plurality of vertically spaced apart sections of substantial vertical length, while substantially excluding gaseous flow in the portions of said column between said sections, maintaining the gas flow opposite in direction in successive sections, and passing a heat exchange fluid in indirect heat transfer relationship with said contact material in said column in at least some of said portions of said column between said sections.

3. A method for catalytic conversion of hydrocarbons in the presence of a particle form solid contact material which comprises: maintaining a substantially compact confined, vertical column of downwardly flowing particle form contact material, effecting a progressive increase in the width of said column in one horizontal direction from the upper to the lower end thereof, supplying particle form contact material to the upper end of said column and withdrawing particle form contact material from the lower end thereof, passing gaseous reactant hydrocarbons transversely across said column in the direction of its varying width independently at a plurality of substantially spaced apart vertical sections of said column, the gas flow in successive sections being opposite in direction.

4. The method for regenerating a particle form contact material bearing a carbonaceous contaminant deposited during hydrocarbon conversion in the presence of said contact material which method comprises: flowing a particle form contact material downwardly through a confined regeneration zone as a substantially compact column, effecting a progressive increase in the width of said column in one horizontal direction from the upper to the lower end thereof, supplying spent contact material to the upper end of said column, withdrawing regenerated contact material from the lower end thereof, passing oxygen containing gas substantially horizontally through said column in the direction of its varying width at a plurality of substantially vertically spaced apart vertical sections along its length to effect the burning off of said contaminant deposit, successive sections being spaced apart a greater distance than their widths in the direction of gas flow causing the gas to flow in opposite directions in successive vertically spaced apart sections, and controlling the temperature of said contact material below a level which would cause heat damage thereto by passing a cooling medium in indirect heat transfer relationship with said contact material in said column at levels intermediate said sections for gas flow.

5. An apparatus for conducting gaseous reactions in the presence of a particle form solid contact material comprising: members defining a substantially vertical passage for solid flow which passage is of progressively increasing width between said defining members from its upper to its lower end, the opposing defining members on two opposite sides of said passage having along their length a plurality of alternating intervals of foraminate and non-foraminate areas, the foraminate areas being adapted to permit passage of gas through the defining members while excluding the flow of the solid contact material particles therethrough and the foraminate areas on the defining members on said two opposite sides of said passage being at corresponding levels, means to supply particle form solid contact material to the upper end of said passage, means to withdraw solid from the lower end of said passage, members defining a plurality of separate gas chambers adjacent the outer face of the two opposing defining members provided with said intervals of foraminate areas, one gas chamber extending along the full length and breadth of each of said intervals of foraminate area on the outer face of each of the opposing defining members containing said foraminate areas, a separate gas inlet duct connecting separately into one of said gas chambers at each interval of foraminate areas, a separate gas outlet duct connecting separately into the remaining one of said gas chambers at each interval of foraminate areas, a plurality of spaced heat transfer tubes positioned in said passage for solid flow only at the levels of said intervals of non-foraminate areas, an independent inlet manifold for supply of heat exchange fluid to the tubes communicating with the tubes at each of said intervals of non-foraminate areas, a flow throttling device associated with each independent inlet manifold and manifolds for withdrawal of heat exchange fluid from said tubes communicating with the tubes at each of said levels.

6. An apparatus for conducting gaseous reactions in the presence of a particle form solid contact material comprising: a vertical shaft, two opposite sides of which converge toward the top of the shaft and are perforated at spaced intervals along their length to allow gas to flow transversely through the shaft, said two opposite converging sides having substantial intervals of non- perforated areas along their lengths intermediate the intervals of perforated areas, means to supply particle form solid material to the upper end of said shaft and means to withdraw solid material from the lower end thereof, a plurality of separate confined gas chambers along the outer faces of said two converging sides of said shaft, a separate one of said gas chambers extending along the breadth and length of each of said intervals of foraminate areas and being isolated from all other gas chambers except through the perforated areas in said shaft sides, means to independently supply gas to alternate gas chambers along the outer face of one of said shaft sides and means to separately withdraw gas from the corresponding alternate gas chambers at corresponding levels along the outer face of the opposite one of said shaft sides, means to independently supply gas to the remaining alternate gas chambers along the outer face of the last named shaft side and means to separately withdraw gas from the remaining alternate chambers along the outer face of the first named shaft side, heat transfer tubes positioned in vertically spaced apart groups within said shaft only at levels corresponding to the intervals of non-perforated areas along the shaft sides, independent heat exchange fluid inlet manifolds communicating with the groups of tubes at each of said intervals of non-perforated areas, flow throttling means associated with each of said inlet manifolds and outlet manifolds for withdrawal of heat exchange fluid communicating with the groups of tubes at each of said levels.

7. An apparatus for conducting gaseous reactions in the presence of a particle form solid material comprising: a substantially vertical, elongated vessel of rectangular cross-sectional shape, two opposed upright partitions across said chamber between two opposite walls thereof, said partitions being spaced apart in fixed downwardly diverging relation with inner faces thereof defining a central path for gravitational descent of solid material through said vessel, which path is of progressively greater width at successive levels downward and said partitions being spaced inwardly from top to bottom thereof from the remaining two walls of said vessel which are opposite the outer faces of said partitions whereby a gas chamber is defined along the length and breadth of the outer face of each of said diverging partitions between the outer face thereof and the opposing wall of said vessel, a plurality of areas of louvered openings positioned at a plurality of corresponding spaced apart levels along both of said partitions, so as to provide at levels between successive louvered areas in each partition, non-foraminate areas of substantial length, said louvered areas being comprised of upwardly and outwardly extending louvers in said partitions adapted to exclude gravity flow of the solid material particles therethrough while permitting gas flow, passage defining members at the upper end of said vessel defining a confined solid inlet passage into said path between said diverging partitions, conduit means for withdrawal of solids from the lower end of said vessel, partitions extending across the gas chamber between each of the diverging partitions and the opposing wall of said vessel, positioned at levels between successive spaced louvered areas to define at each of said corresponding spaced apart levels of louvered areas a separate gas manifold chamber on each of the two opposite sides of said path for solid flow communicating with said path through the louvered areas at that level, each of said gas manifold chambers being completely isolated from any other gas manifold chamber on the same side of said path, a separate gas inlet duct connecting into one of said separate gas chambers at each of said levels and a separate gas outlet duct connecting into the opposite gas chamber at each level, heat transfer tubes within said path between said diverging partitions only at the levels of at least some of said non-foraminate areas and means to pass a heat exchange fluid through said tubes.

8. An apparatus for conducting gaseous reactions in the presence of a particle form solid material comprising: a substantially vertical, elongated vessel of rectangular cross-sectional shape, two opposed upright partitions spaced apart within said vessel in fixed downwardly diverging relation and extending from their upper to lower ends through a major portion of the vessel length lying intermediate its ends, with the inner faces of said partitions defining therebetween a passage for gravitational descent of solid material which is of progressively greater width between said partitions at each level increment from top to bottom of said partitions, said partitions extending laterally entirely across said vessel between two opposite walls thereof but being spaced inwardly from the vessel walls which oppose the outer faces of said partitions whereby a gas chamber is defined along the length and breadth of each partition between the outer face thereof and the opposing vessel wall, a plurality of corresponding alternating intervals of foraminate and non-foraminate areas along said partitions, each non-foraminate area being of greater length than the horizontal distance between the opposing partitions at the vertical levels corresponding to the upper and lower borders of the non-foraminate area, partitions positioned within the upper section of said vessel arranged to define a seal chamber communicating only with said solid flow passage, means to supply contact material to said seal chamber and means to withdraw contact material from the lower end of said vessel, additional partitions in each of said gas spaces on opposite sides of said passage for solid flow, sloping downwardly from the vessel wall and connecting to the one of said first named partitions which is nearest that wall approximately at the level of the upper end of each of said intervals of non-foraminate areas, openings in said first named partitions arranged to permit solid flow from said last named sloping partitions into said passage for solid flow, said last named sloping partitions also serving to divide said gas chambers into a series of separate gas manifold chambers, one gas manifold chamber being provided on either side of said passage for solid flow at each of said corresponding intervals of foraminate areas, a gas inlet conduit connecting separately into one of said gas manifold chambers at each of said intervals and separate gas outlet conduit connecting into each of the remaining gas chambers, heat transfer tubes positioned in vertically spaced groups within said passage for solid flow at the levels of at least some of said intervals of non-foraminate areas, and means to pass a heat exchange fluid independently through the group of tubes at each of said intervals.

9. An apparatus for conducting gaseous reactions in the presence of a particle form solid material comprising: a substantially vertical, elongated vessel of rectangular cross-sectional shape, two opposed upright partitions across said chamber between two opposite walls thereof, said partitions being spaced apart in fixed downwardly diverging relation with inner faces thereof defining a central path for gravitational descent of solid material through said vessel, which path is of progressively greater width at successive levels downward and said partitions being spaced inwardly all along their length from the remaining two walls of said vessel which are opposite the outer faces of said partitions whereby a gas chamber is defined along the length and breadth of the outer face of each of said diverging partitions between the outer face thereof and the opposing wall of said vessel, said partitions having along their lengths a plurality of corresponding alternating intervals of foraminate and non-foraminate areas, a plurality of spaced apart partitions in each of said gas chambers on opposite sides of said passage for solid flow, each one of said partitions sloping downwardly across the gas chamber from the vessel wall and connecting to the one of said first named diverging partitions nearest said wall at the level corresponding approximately to the upper border of each of said intervals of non-foraminate areas, said last named partitions dividing each of said gas chambers into a series of superimposed, isolated gas manifold chambers, a separate one of said gas manifold chambers being provided on opposite sides of said solid flow path for each interval of foraminate areas, openings in said first named diverging partitions at the levels of said last named partitions for passage of solid from said gas manifold chambers back into said solid flow path, a separate gas inlet conduit connecting into one of said gas manifold chambers for each interval of foraminate areas and a separate outlet conduit connecting into each remaining gas chamber for each interval of foraminate areas, means to introduce solid material to the upper end of said solid flow path and means to withdraw solid material from the lower end thereof.

LOUIS P. EVANS.

REFERENCES CITED

The following references are of record in the file of this patent:

UNITED STATES PATENTS

| Number | Name | Date |
| --- | --- | --- |
| 335,137 | Lillie | Feb. 2, 1886 |
| 992,295 | Tiemann | May 16, 1911 |
| 1,174,464 | Agnew | Mar. 7, 1916 |
| 1,892,319 | Roth | Dec. 27, 1932 |
| 2,320,562 | Bransky | June 1, 1943 |
| 2,344,449 | Ogorzaly | Mar. 14, 1944 |
| 2,367,281 | Johnson | Jan. 16, 1945 |
| 2,371,095 | Woodward | Mar. 6, 1945 |
| 2,409,596 | Simpson et al. | Oct. 15, 1946 |
| 2,436,780 | Simpson | Feb. 24, 1948 |

FOREIGN PATENTS

| Number | Country | Date |
| --- | --- | --- |
| 275,760 | Great Britain | Aug. 18, 1927 |